(12) United States Patent
Lutnick et al.

(10) Patent No.: US 11,704,017 B2
(45) Date of Patent: *Jul. 18, 2023

(54) KEYBOARD TRADING SYSTEM

(71) Applicant: BGC PARTNERS, INC., New York, NY (US)

(72) Inventors: Howard W. Lutnick, New York, NY (US); Joseph C. Noviello, Summit, NJ (US); Michael Sweeting, Surrey (GB); Lee M. Amaitis, Las Vegas, NV (US); James C. Johnson, Ridgewood, NJ (US)

(73) Assignee: BGC PARTNERS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/329,022

(22) Filed: May 24, 2021

(65) Prior Publication Data

US 2021/0278944 A1 Sep. 9, 2021

Related U.S. Application Data

(63) Continuation of application No. 16/421,962, filed on May 24, 2019, now Pat. No. 11,016,662, which is a
(Continued)

(51) Int. Cl.
*G06Q 40/04* (2012.01)
*G06F 3/0489* (2022.01)
(Continued)

(52) U.S. Cl.
CPC .......... *G06F 3/0489* (2013.01); *G06F 3/0219* (2013.01); *G06F 3/0233* (2013.01); *G06Q 40/04* (2013.01)

(58) Field of Classification Search
CPC .... G06F 3/0489; G06F 3/0219; G06F 3/0233; G06Q 40/04
(Continued)

(56) References Cited

U.S. PATENT DOCUMENTS 4,460,960 A * 7/1984 Anderson ............. G07F 7/1016
705/72
4,688,020 A * 8/1987 Kuehneman .......... G06F 3/0238
341/23
(Continued)

FOREIGN PATENT DOCUMENTS

| JP | 2005504370 A | * | 2/2005 | |
| WO | WO-9114231 A | * | 9/1991 | ............. G06Q 40/04 |
| WO | WO-9506918 A2 | * | 3/1995 | ............. G06Q 40/04 |

OTHER PUBLICATIONS

"Screen-Based Trading in Futures Markets: Recent Developments and Research Propositions," by Bruce W. Weber. Proceedings of the 32nd Hawaii International Conference on System Science. 1999. (Year: 1999).*

*Primary Examiner* — Sara C Hamilton (57) ABSTRACT

The present invention relates to systems and methods for providing customized keyboards for receiving user inputs, and view regions for displaying information for users in useful arrangements. Such keyboards include keys that are pre-programmed to reflect the issues present in each trading pane of the view regions. Using such keys, a user may direct the trading application to quickly and efficiently switch between multiple issues, and place, manipulate or cancel orders on them. The keyboard may also be designed such that multiple keys may be disabled, replaced or mapped to perform different functions.

8 Claims, 11 Drawing Sheets

Related U.S. Application Data continuation of application No. 14/589,318, filed on Jan. 5, 2015, now Pat. No. 10,331,344, which is a continuation of application No. 10/699,858, filed on Oct. 31, 2003, now Pat. No. 8,930,256.

(60) Provisional application No. 60/486,394, filed on Jul. 10, 2003, provisional application No. 60/465,246, filed on Apr. 23, 2003, provisional application No. 60/423,618, filed on Oct. 31, 2002.

(51) Int. Cl.
*G06F 3/023* (2006.01)
*G06F 3/02* (2006.01)

(58) Field of Classification Search
USPC .......................................... 705/37
See application file for complete search history.

(56) References Cited

U.S. PATENT DOCUMENTS

| | | | | |
|---|---|---|---|---|
| 4,906,117 A * | 3/1990 | Birdwell | ............... | B41J 5/10 400/490 |
| 5,038,284 A * | 8/1991 | Kramer | ............... | G06Q 40/04 705/37 |
| D335,660 S * | 5/1993 | Busch | ............... | D14/392 |
| 5,243,331 A * | 9/1993 | McCausland | ......... | G06F 3/0235 340/4.5 |
| 5,297,031 A * | 3/1994 | Gutterman | ............. | G06Q 40/04 705/37 |
| 6,505,174 B1 * | 1/2003 | Keiser | ............... | G06Q 40/04 705/36 R |
| 6,609,146 B1 * | 8/2003 | Slotznick | ............... | G06F 9/451 709/200 |
| 6,625,583 B1 * | 9/2003 | Silverman | ............ | G06F 3/04883 705/37 |
| 7,243,083 B2 * | 7/2007 | Burns | ............... | G06Q 40/04 705/37 |
| 7,389,268 B1 * | 6/2008 | Kemp, II | ............... | G06Q 30/08 705/37 |
| 7,768,501 B1 * | 8/2010 | Maddalozzo, Jr | .. | G06F 3/04886 345/173 |
| 2002/0029180 A1 * | 3/2002 | Kirwin | ................ | G06Q 20/102 705/37 |
| 2002/0070915 A1 * | 6/2002 | Mazza | ................ | G06Q 40/04 345/156 |
| 2002/0073014 A1 * | 6/2002 | Gilbert | ................ | G06Q 40/06 705/37 |
| 2002/0159809 A1 * | 10/2002 | McLoone | ............. | G06F 3/0213 400/472 |
| 2003/0004853 A1 * | 1/2003 | Ram | ................ | G06Q 40/04 705/37 |
| 2003/0004862 A1 * | 1/2003 | Lutnick | ................ | G06Q 40/00 705/37 |
| 2003/0009411 A1 * | 1/2003 | Ram | ................ | G06F 40/18 705/37 |
| 2003/0018569 A1 * | 1/2003 | Eisenthal | ............... | G06Q 40/04 705/37 |
| 2003/0097325 A1 * | 5/2003 | Friesen | ................ | G06Q 30/08 705/37 |

* cited by examiner

| 2Y☐ | | | | | |
|---|---|---|---|---|---|
| 1.62 03/05 | | - 100.056 ◇ x1 | | 1∧ | |
| 100.052 ↑ | | | | | |
| L100.02 | | | | | |
| OLD 1.50 02/05 | ◇ 99.31 | - 99.31 | ◇ 1x1 | | |
| ROL 504/2Y | 103.197 | - 103.197 | 5x5 | g305.95 / p305.95 | |
| 2BK 1.62 01/05 | ◇ 100.03+ | - 100.03+ | ◇ 1x1 | | |
| CUR 02Y/3Y | | | | | |

| 5Y☐ | | | | |
|---|---|---|---|---|
| 3.00 02/08 | ◇ 100.26 | - | 1x | 1∧ |
| 100.262 ↓ | ◇ 100.256 | - | 1x | |
| L100.12 | | | | |
| OLD 3.00 11/07 | ◇ 102.16+ | - 102.16+ | ◇ 1x1 | |
| ROL NO6/5Y | 101.00 | - 101.00 | 5x5 | g107.12 / p107.12 |
| 2BK 3.25 08/07 | ◇ 103.16 | - 103.16 | ◇ 1x1 | |
| CUR 05Y/10Y | 200.00 | / 200.00 | 5x5 | |

| 3Y☐ |
|---|
| usg + 03Y |

| WI | WI/2Y |
|---|---|
| ROL | WI/5Y |
| 2BK | WI/10Y |
| CUR | WI/30Y |

| 10Y☐ | | | | | |
|---|---|---|---|---|---|
| 3.87 02/13 | | 99.26+ - 99.26+ | 2x1 | 1 | |
| 99.26+ ↑ | | 99.25 - 99.29+ | 1x1 | 1∧ | |
| L99.16 | | 99.23 | 1x | | |
| OLD 4.00 11/12 | | 102.06+ - 102.06+ | 1x1 | 1 | |
| ROL 811/10Y | | 91.26 - 91.26 | 5x5 | | p132.59 / g132.59 |
| 2BK 4.37 08/12 | | 103.12 - 103.12 | 1x1 | | |
| CUR 10Y/30Y | | 18.00 / 18.00 | 5x5 | | |

| 30Y☐ | | | |
|---|---|---|---|
| 5.37 02/31 | ◇ 99.31 - 99.31 | 1x1 | 1 |
| 99.31 ↑ | ◇ 99.29 - 100.01 | 1x1 | |
| L107.16 | | | |
| OLD 6.25 05/30 | ◇ 116.21 - 116.21 | 1x1 | 1 |
| ROL 530/30Y | 104.162 - 104.162 | 5x5 | p103.30 / g103.30 |
| 2BK 6.12 08/29 | ◇ 112.25+ - 112.25+ | 1x1 | |
| CUR 10Y/30Y | 18.00 / 18.00 | 5x5 | |

| Q6 | TIPS | FX | Agencies | EGBs | Euros |
|---|---|---|---|---|---|
| 6 - 1 | 3.37 01/07 | 109.18 | 109.20 | 1x1 | |
| 6 - 2 | 3.62 01/08 | 111.14+ | 111.17 | 1x1 | |
| 6 - 3 | 3.87 01/09 | 112.28 | 112.30+ | 1x1 | |
| 6 - 4 | 4.25 01/10 | 115.24 | 115.24 | 1x1 | |
| 6 - 5 | 3.50 01/11 | 111.27+ | 111.30+ | 1x1 | |
| 6 - 6 | 3.37 01/12 | 111.18+ | 111.21 | 1x1 | |
| 6 - 7 | 3.00 07/12 | 108.14+ | 108.17+ | 1x1 | |

Active Orders \ Trade History (1) \ Market History \ Client Checkout \ Status

| Status | Type | Size | Inst Name | Price/Rate | Time ▽ | Comments | Trade Ref# |
|---|---|---|---|---|---|---|---|
| ACCEPTED | OFFER | 1 | tip - 510Y | 111.17 | 11:12:24 03/31 | Command Successful | |
| ACCEPTED | OFFER | 1 | tip - 410Y | 112.30+ | 11:12:22 03/31 | Command Successful | |
| ACCEPTED | OFFER | 1 | tip - 310Y | 115.24 | 11:12:18 03/31 | Lock price market accepted | |
| ACCEPTED | OFFER | 1 | tip - 210Y | 111.30+ | 11:12:17 03/31 | Command Successful | |
| ACCEPTED | OFFER | 1 | tip - 110Y | 111.21 | 11:12:14 03/31 | Command Successful | |

800

| | | | | | | |
|---|---|---|---|---|---|---|
| 2Y☐ | | | | | | 1∧ |
| 1.62 03 / 05 | | - 100.056 | ◊ | x1 | | |
| 100.052↑ | | | | | | |
| L100.02 | | | | | | |
| OLD 1.50 02 / 05 | ◊ 99.31 | - 99.31 | ◊ | 1x1 | | |
| ROL 504 / 2Y | 103.197 | - 103.197 | | 5x5 | g305.95 / p305.95 | |
| 2BK 1.62 01 / 05 | ◊ 100.03+ | - 100.03+ | ◊ | 1x1 | | |
| CUR 02Y / 3Y | | | | | | |

710 brackets the above two sections.

| 10Y | | | | | 1 | 1 |
|---|---|---|---|---|---|---|
| 3.87 02 / 13 | 99.26+ | - 99.26+ | | 2x1 | 1∧ | |
| 99.26+↑ | 99.25 | - 99.29+ | | 1x1 | | |
| L99.16 | 99.23 | - | | 1x | | |
| OLD 4.00 11 / 12 | 102.06+ | - 102.06+ | | 1x1 | | |
| ROL 811 / 10Y | 91.26 | - 91.26 | | 5x5 | p132.59 / g132.59 | |
| 2BK 4.37 08 / 12 | 103.12 | - 103.12 | | 1x1 | | |
| CUR 10Y / 30Y | 18.00 | / 18.00 | | 5x5 | | |

740 brackets the above section.

| 5Y☐ | | | | | 1∧ | |
|---|---|---|---|---|---|---|
| 3.00 02 / 08 | ◊ 100.26 | - | | 1x | | |
| 100.262↓ | ◊ 100.256 | - | | 1x | | |
| L100.12 | | | | | | |
| OLD 3.00 11 / 07 | ◊ 102.16+ | - 102.16+ | ◊ | 1x1 | | |
| ROL NO6 / 5Y | 101.00 | - 101.00 | | 5x5 | g107.12 / p107.12 | |
| 2BK 3.25 08 / 07 | ◊ 103.16 | - 103.16 | ◊ | 1x1 | | |
| CUR 05Y / 10Y | 200.00 | / 200.00 | | 5x5 | | |

720 brackets the above section.

| 30Y☐ | | | | | 1 | 1 |
|---|---|---|---|---|---|---|
| 5.37 02 / 31 | ◊ 99.31 | - 99.31 | ◊ | 1x1 | | |
| 99.31 | ◊ 99.29 | - 100.01 | ◊ | 1x1 | | |
| L107.16 | | | | | | |
| OLD 6.25 05 / 30 | ◊ 116.21 | - 116.21 | ◊ | 1x1 | | |
| ROL 530 / 30Y | 104.162 | - 104.162 | | 5x5 | p103.30 / g103.30 | |
| 2BK 6.12 08 / 29 | ◊ 112.25+ | - 112.25+ | ◊ | 1x1 | | |
| CUR 10Y / 30Y | 18.00 | / 18.00 | | 5x5 | | |

750 brackets the above section.

| 3Y☐ | | |
|---|---|---|
| usg + 03Y | | |
| | | |
| WI WI / 2Y | | |
| ROL WI / 5Y | | |

730 brackets the above section.

| 2Y☐ | | | | | | | | 5Y☐ | | | | | | |
|---|---|---|---|---|---|---|---|---|---|---|---|---|---|---|
| 1.62 03/05 ◊ 100.042-100.046 ◊ | | | 1x67 | | 1 | 67 | | 3.00 02/08 TAK | | | | | 1 | ◊100.266 - |
| 100.046 ↓ | -100.052 ◊ | | x1 | | | | | 100.266 ↑ | ◊ 100.262 - | | | | 0x | 1x |
| | -100.056 ◊ | | x1 | | | | | | ◊ 100.26 - | | | | | 1x |
| L100.02 | | | | | | | | L100.12 | ◊ 100.256 - | | | | | 1x |
| 2 | 1.50 02/05 | ◊ 99.31 - 99.31 | | ◊ 1x1 | | | | 2 | 3.00 11/07 ◊ 102.16+ - 102.16+ | | | ◊ 1x1 | | |
| 3 | 504/2Y | 103.197 - 103.197 | | 5x5 | | | | 3 | NO6/5Y | 101.00 - 101.00 | | 5x5 | | |
| 4 | 1.62 01/05 | ◊ 100.03+ - 100.03+ | | ◊ 1x1 | | | | 4 | 3.25 08/07 ◊ | 103.16 - 103.16 | | ◊ 1x1 | | |
| 5 | 404/2Y | | | | | | | 5 | 506/5Y | 103.13 - 103.13 | | 5x5 | | |
| 1-1 | 02Y/3Y | 200.00 / 200.00 | | 5x5 | | | | 1-1 | WI/5Y | 200.00 / 200.00 | | 5x5 | | |
| 2-1 | 02Y/5Y | | | | | | | 2-1 | 05Y/10Y | | | | | |
| 3-1 | 02Y/Jun 03 | | | | | | | 3-1 | 05Y/Jun 03 | | | | | |
| 4-1 | usg-705Y/Ju | | | | | | | 4-1 | usg-205Y/Ju | | | | | |
| 5-1 | 2Y Jun 03 | | | | | | | 5-1 | 5Y Jun 03 | | | | | |
| 3Y☐ | | | | | | | | 10Y☐ | | | | | | |
| usg + 03Y | | | | | | | | 3.87 02/13 | | | | 99.26+ - 99.26+ | 1x1 | |
| 30Y☐ | | | | | | | | Q6 | | | | | | |
| 5.37 02/31 | | -99.31 ◊ | | x1 | | | | 1 | 3.37 01/07 | | | | | |

| Active Orders | Trade History (1) | Market History | Client Checkout | Status |
|---|---|---|---|---|

| Status | Type | Size | Inst Name | Price/Rate | Time ▽ | Comments | Trade Ref# |
|---|---|---|---|---|---|---|---|
| ACCEPTED | OFFER(LIMIT) | 1 | usg_02Y | 100.056 | 11:09:38 03/31 | Limit market accepted into Book | |
| ACCEPTED | OFFER | 67 | usg_02Y | 100.046 | 11:09:34 03/31 | Lock price market accepted | |
| ACCEPTED | BID | 1 | usg_10Y | 99.26+ | 11:09:27 03/31 | Lock price market accepted | |
| ACCEPTED | OFFER | 1 | usg_30Y | 99.31 | 11:09:23 03/31 | Lock price market accepted | |
| ACCEPTED | BID | 5 | usg_205Y/5Y | 103.13 | 11:09:16 03/31 | OK: Bid 5@103.406250 Accepted! | |
| ACCEPTED | OFFER | 5 | usg_205Y/5Y | 103.13 | 11:09:15 03/31 | OK: Offer 5@103.406250 Accepted! | |

| TIPS | FX | Agencies | EGBs | Euros |
|---|---|---|---|---| g305.95 / p305.95    g107.12 / p107.12    g81.27 / p81.27

940 {
| 2 | 3.00 11 / 07 | ◊ 102.16+ | - 102.16+ ◊ | 1x1 | |
|---|---|---|---|---|---|
| 3 | N06 / 5Y | 101.00 | - 101.00 | 5x5 | g107.12 / p107.12 |
| 4 | 3.25 08 / 07 | ◊ 103.16 | - 103.16 ◊ | 1x1 | |
| 5 | 506 / 5Y | 103.13 | - 103.13 | 5x5 | g81.27 / p81.27 |
| 1 - 1 | WI / 5Y | | | | |
| 2 - 1 | 05Y / 10Y | 200.00 | / 200.00 | 5x5 | |
| 3 - 1 | 05Y / Jun 03 | | | | |
| 4 - 1 | usg-205Y / Ju | | | | |
| 5 - 1 | 5Y Jun 03 | | | | |

920 {
| 3Y □ | |
|---|---|
| usg + 03Y | |

950 {
| 10Y □ | | | |
|---|---|---|---|
| 3.87 02/13 | 99.26+ | - 99.26+ | 2x1 |

930 {
| 30Y □ | | | | |
|---|---|---|---|---|
| 5.37 02/31 | ◊ 99.31 | - 99.31 ◊ | 1x1 | |

960 {
| Q6 | TIPS | FX | Agencies | EGBs | Euros |
|---|---|---|---|---|---|
| 1 | 3.37 01/07 | 109.18 | -109.20 | | |

780 {
| Active Orders \ Trade History (1) \ Market Hi ◄ ▶ | | | | | |
|---|---|---|---|---|---|
| Status | Type | Size | Inst Name | Price/Rate | Time ▽ |
| ACCEPTED | BID(LIMIT) | 1 | usg_05Y | 100.24+ | 11:14:10 03 / 31 |
| ACCEPTED | OFFER(LIMIT) | 1 | usg_05Y | 100.272 | 11:14:08 03 / 31 |
| ACCEPTED | OFFER(LIMIT) | 1 | usg_05Y | 100.27+ | 11:14:04 03 / 31 |
| ACCEPTED | OFFER(LIMIT) | 1 | usg_05Y | 100.266 | 11:14:00 03 / 31 |
| ACCEPTED | OFFER | 1 | usg_05Y / 5Y | 100.26 | 11:13:58 03 / 31 |

FIG. 11

KEYBOARD TRADING SYSTEM

CROSS-REFERENCES TO RELATED APPLICATIONS

This application is a continuation of U.S. patent application Ser. No. 16/421,962 filed May 24, 2019 which is a continuation of U.S. patent application Ser. No. 14/589,318 filed Jan. 5, 2015 (now U.S. Pat. No. 10,331,344 issued on Jun. 25, 2019) which is a continuation of U.S. patent application Ser. No. 10/699,858 filed on Oct. 31, 2003 (now U.S. Pat. No. 8,930,256 issued on Jan. 6, 2015), which further claims the benefit of U.S. Provisional Application No. 60/423,618 filed Oct. 31, 2002, U.S. Provisional Application No. 60/465,246 filed Apr. 23, 2003, and U.S. Provisional Application No. 60/486,394 filed Jul. 10, 2003, all of which are hereby incorporated by reference herein in their entirety.

BACKGROUND OF THE INVENTION

This invention relates to user input devices and view regions. More specifically, this invention relates to customized keyboards for receiving user inputs, and view regions for displaying information for the user in useful arrangements.

Much trading today involves some computer support, from simple information delivery to sophisticated trading systems that automate transactions of goods and services. In recent years, electronic trading systems have gained widespread acceptance for trading of a wide variety of items ranging from financial instruments (such as stocks, bonds, currency, futures, options, etc.) to household goods (such as old records, antiques, wines, etc.) As electronic trading becomes more popular, an increasing number of traders are in need of new systems and methods to enter trade commands in a quick, efficient, and accurate manner. In one method of electronic trading, bids and offers are submitted by traders to a trading system, those bids and offers are then displayed by the trading system to other traders, and the other traders may then respond to the bids and offers by submitting sell (or hit) or buy (or lift) commands to the system.

Many implementations of such methods of electronic trading, while generally accurate, lack in desired speed mainly because traders are forced to use both a standard keyboard and a pointing device to execute a trade. This dual process causes much delay for traders because the traders must follow several steps prior to accomplishing a trade. For example, many traders using typical trading systems are required to use a mouse to point on an issue of choice, click on it and use a PC keyboard to enter a price and size for the trade.

In other implementations of electronic trading methods, traders are forced to use a pointing device exclusively to execute trades. This process causes much delay for traders because the traders must sometimes follow even more steps prior to accomplishing a trade. For example, many traders using such trading systems are required to use a mouse to point on an issue of choice, and click on it in order to display a dialog box or window containing several other buttons that must be pressed with the mouse before a trade can be executed.

Not only do some of the aforementioned trading methods waste considerable amounts of valuable time, they additionally distract traders from focusing on market movements and other trades while they attempt to execute their trades. This may be because such traders have to interact with windows or dialog boxes containing buttons that enable them to enter trades while, at the same, paying close attention to market activity.

The benefit of using a keyboard is that a trader may execute a trade with more speed than with a mouse. For example, a trader may use all ten fingers with a keyboard, while with a mouse, the trader may use no more than two or three fingers. However, many trading professionals who frequently have large amounts of money at stake continue to use pointing devices that are considered easy to use, because they feel they are less likely to make unwarranted trading mistakes due to multiple key compressions and prefer to forgo speed and efficiency for peace of mind.

Therefore, there is a need for providing systems and methods that enable a trader to execute trades quickly, efficiently, and accurately using a customized keyboard.

SUMMARY OF THE INVENTION

It is an object of the invention to provide systems and methods that enable a trader to execute trades quickly, efficiently, and accurately using a customized keyboard.

In accordance with this and other objects of the invention, a customized keyboard for receiving user inputs from a trader and view regions for displaying information for the trader in useful arrangements are provided. Traders, users or market participants may use the customized keyboard to navigate through a view region. The keyboard preferably includes keys that are pre-programmed to reflect the issues present in each trading subregion, "quadrant" or "pane," where key trading indicators are displayed. Order keys that may be associated with specific benchmark issues, instruments relating to benchmark issues or non-benchmark issues allow a user to display and select trading panes as well as place orders on such issues. The user can use other keys to switch between multiple issues in a pane or other panes, quickly and efficiently create orders, manipulate orders, cancel orders, and obtain trading information on these issues. Such keys may be preconfigured or mapped to perform functions based on the type of view or mode a user is in or based on the pane that is selected. The customized keyboard may include means that enable users to switch keyboard configuration and combine multiple keys so as to act as a single larger key, without reprogramming applications or the keyboard.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 7 is an illustration of a view region that may be displayed to a user in accordance with certain embodiments of the present invention;

DETAILED DESCRIPTION OF THE INVENTION

The present invention is directed to user input devices and view regions useful for receiving user input and displaying information. More particularly, the present invention relates to customized keyboards with input keys having arrangements, labels, colorization, programmed functionalities, and the like configured in conjunction with view regions displaying information for users in useful arrangements. In this manner, the view regions and the customized keyboards are configured such that input keys on the keyboard are labeled and function in correspondence to the information displayed on the view region.

The present invention allows any user, market participant or trader, to execute and view trades quickly and accurately. With a customized keyboard, the user need not get distracted with windows or dialog boxes containing interactive buttons that enable users to enter trades by moving a cursor from one point on the screen to another and by clicking on such buttons with a mouse. Instead, the user may use his or her fingers to enter trade commands on different instruments while focusing on as little as one trade window or view region, thereby minimizing the risk of overlooking market activity before, during and after executing a trade.

Moreover, the customized keyboard may be designed such that multiple keys can be combined to act as a single larger key. Keys may be grouped together to perform a single action without reprogramming applications or the keyboard, thereby eliminating the need for multiple key compressions to be entered, and expanding or reducing the number of individually identifiable keys on the keyboard.

The following embodiments of the present invention relate to the electronic trading of fixed income related instruments—e.g., United States Treasuries, United Kingdom Gilts, European Government Treasuries, and Emerging Market debts, swaps, repos, etc. The present invention may also be used for the electronic trading of securities or other financial instruments, such as stocks or currencies, and is not limited only to the trading of fixed income related instruments. The present invention may also be used for the electronic trading of other goods and services.

It should also be noted that although the following embodiments of the present invention relate to the trading of a single instrument, such as thirty-year U.S. Treasury Bonds, these embodiments are not limited only to the trading of a single instrument at a time. Rather, the present invention may also be applied to the trading of a basket of instruments.

For example, users may place offers on the net price movements of the current two, five, ten, and thirty-year U.S. Treasuries.

It should also be noted that the present invention is primarily described herein in terms of a trading application. It will be understood that the trading application may be any suitable, software, hardware, or both configured to implement the features of the present invention. The trading application may be located at a central location (e.g., a central server). In another suitable approach, the trading application may reside among different locations (e.g., a network).

Further details of the present invention are described below in relation to FIGS. 1-11.

Figure 1:
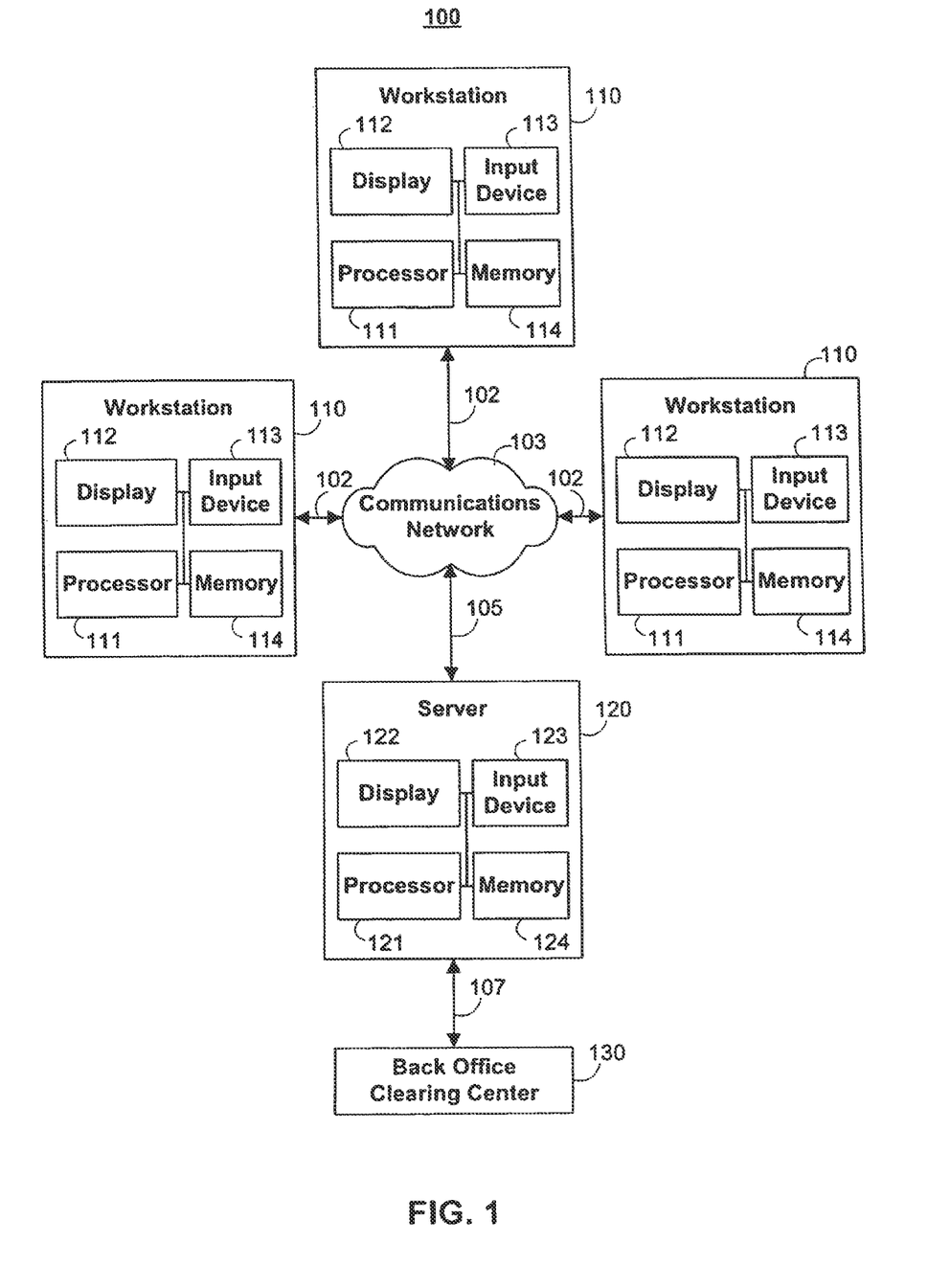
FIG. 1 is a block diagram of a system that may be used to implement the processes and functions of certain embodiments of the present invention.

Referring to FIG. 1, exemplary system 100 for implementing the present invention is shown. As illustrated, system 100 may include one or more workstations 110. Workstations 110 may be local or remote, and are connected by one or more communications links 102 to communications network 103 that is linked via communications link 105 to server 120.

Server 120 may be any suitable server, processor, computer, data processing device, or combination of the same. Server 120 may be used to process and execute trades, and distribute trade and market information to workstations 110. Server 120 may be linked to back office clearing center 130 via communications link 107.

A typical server 120 may include processor 121, display 122, input device 123, and memory 124, which may be interconnected. In a preferred embodiment, memory 124 contains a storage device for storing a server program for controlling processor 121. Processor 121 may use the server program to process trade commands and execute trades communicated from various workstations that are operated by multiple users of system 100, or other users, and communicates trade information to workstations 110 and back office clearing center 130. More specifically, processor 121 may use the server program to process the order placed by a user in response to the user entering commands using input device 113, and execute trades based on such orders, whenever applicable.

Communications network 103 preferably includes the Internet but may consist of any suitable computer network such as an intranet, a wide-area network (WAN), a local-area network (LAN), a wireless network, a digital subscriber line (DSL) network, a frame relay network, an asynchronous transfer mode (ATM) network, a virtual private network (VPN), or any combination of the same. Communications links 102 and 105 may be any communications links suitable for communicating data between workstations 110 and server 120, such as network links, dial-up links, wireless links, hard-wired links, etc.

Workstations 110 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 110 may be used by users to trade instruments in accordance with the embodiments of the present invention.

A typical workstation 110 may include processor 111, display 112, input device 113, and memory 114, which may be interconnected. In a preferred embodiment, memory 114 contains a storage device for storing a workstation program for controlling processor 111. Input device 113 may include keyboard 200, illustrated in FIG. 2, and may be used by users in conjunction with display 112 to execute and monitor trades. Processor 111 may use the workstation program to receive trade information relating to the instruments being traded by multiple users of system 100, or other users, and display such information on display 112 or communicate such information to display 112.

Back office clearing center 130 may be any suitable equipment, such as a computer, a laptop computer, a mainframe computer, etc., or any combination of the same, for causing trades to be cleared and/or verifying that trades are cleared. Communications link 107 may be any communications links suitable for communicating data between server 120 and back office clearing center 130, such as network links, dial-up links, wireless links, hard-wired links, etc.

Figure 2:
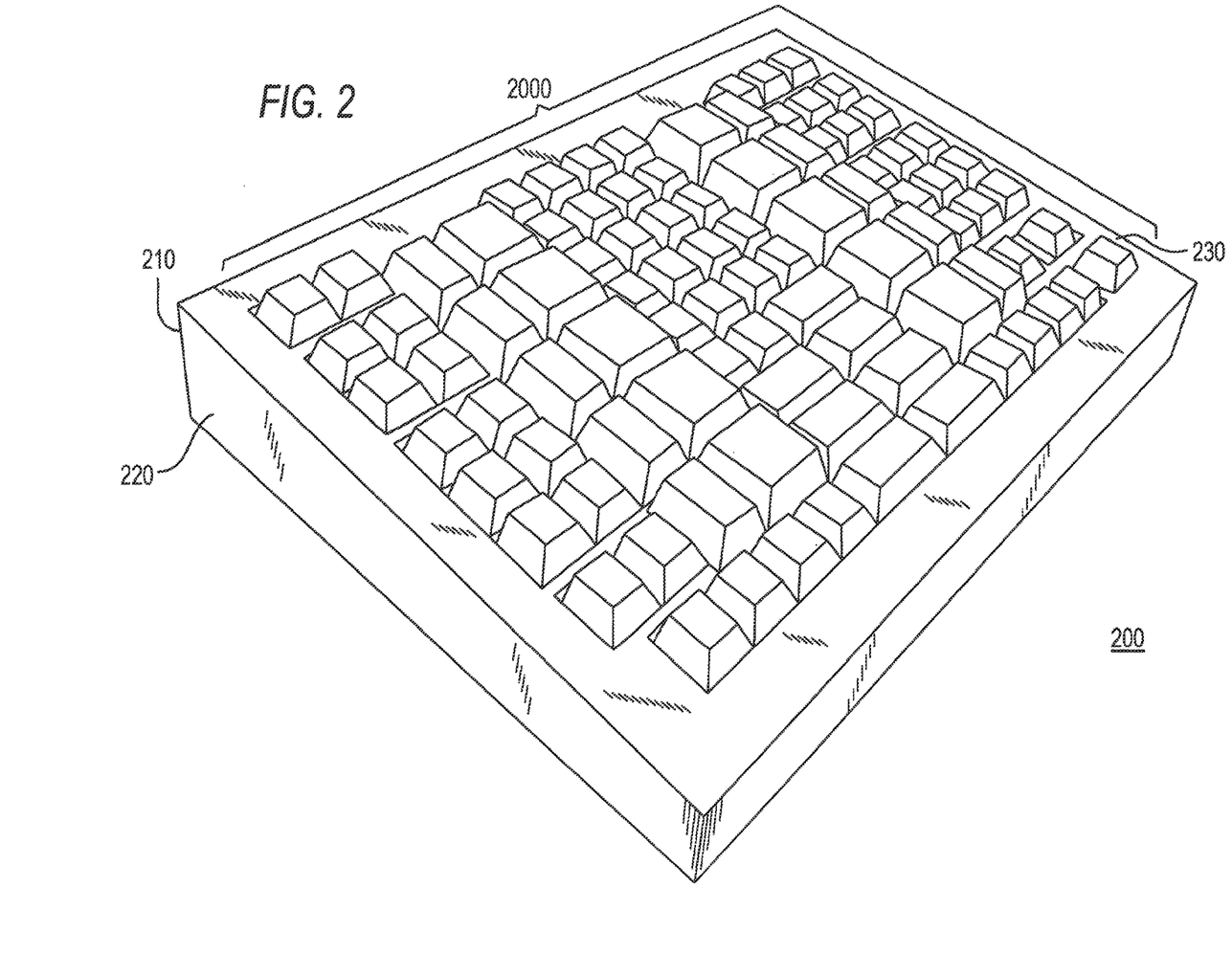
FIG. 2 is a top perspective view of a keyboard according to the present invention.

FIG. 2 is an illustrative schematic view of a custom keyboard 200 that may be included as part of input device 113 of workstation 110 shown in FIG. 1. Keyboard 200 may have back portion 210, shown in FIG. 3, side portion 220, shown in FIG. 4, bottom portion 240, shown in FIGS. 3 and 4, and top portion 230, shown in FIG. 5. Keyboard 200 may include a variety of keys 2000.

Figure 3:
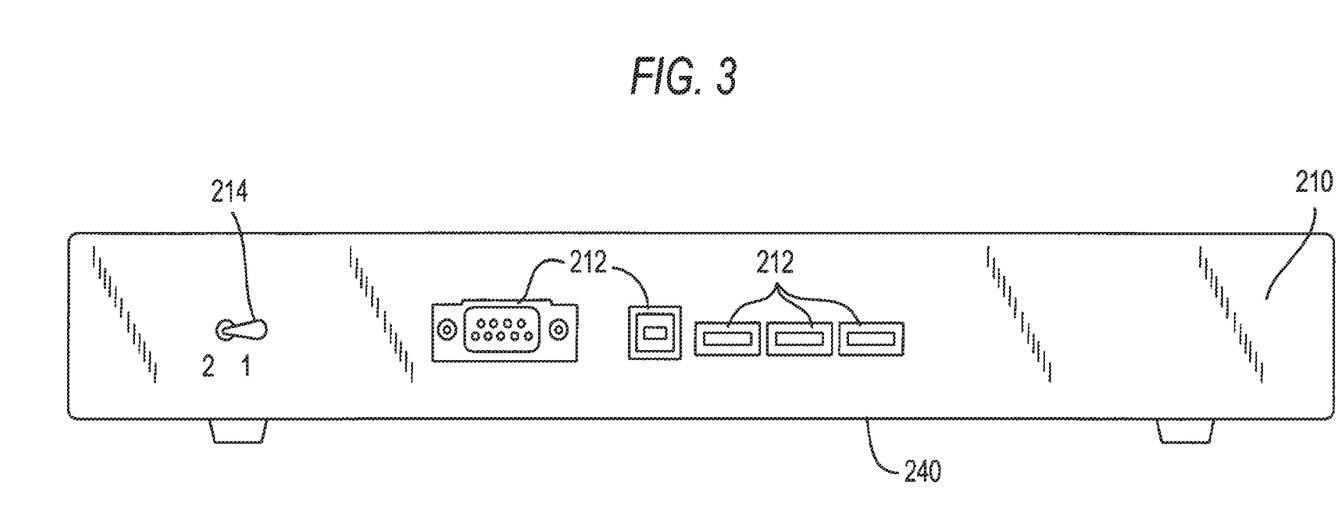
FIG. 3 is a back elevational view of the keyboard of FIG. 2.
Figure 4:
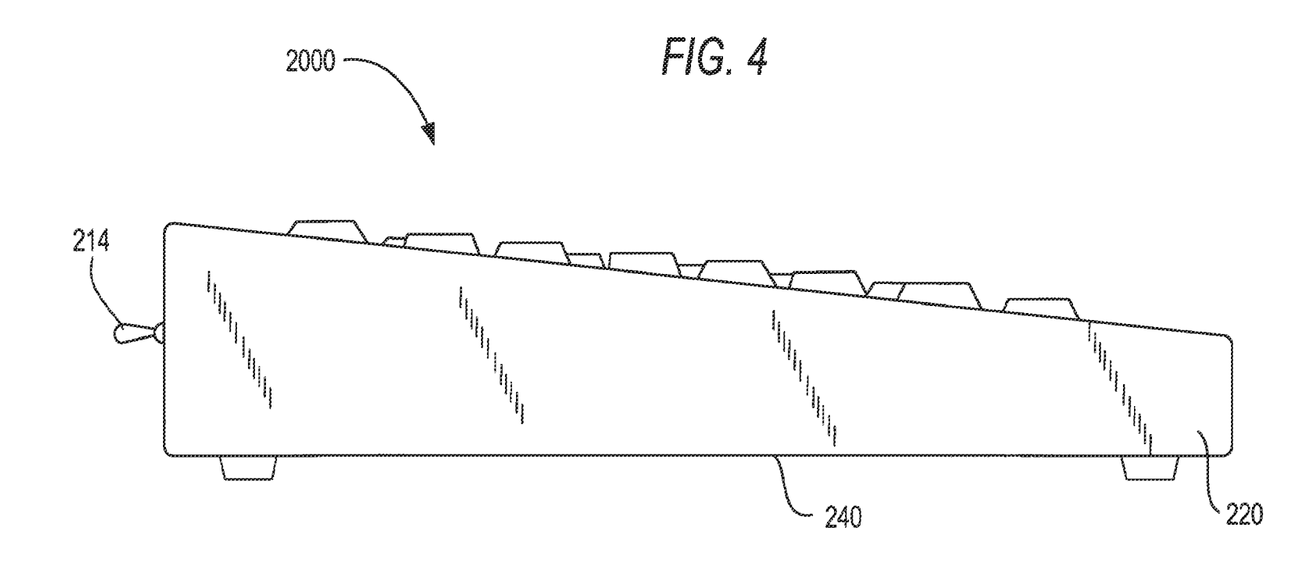
FIG. 4 is a side elevational view of the keyboard of FIG. 2.

As shown in FIG. 3, back portion 210, may include difference types of communication ports that may be used to connect the keyboard to the workstation it is used in. Such communication ports may include communication ports 212—e.g., an optical port, a parallel port, a serial port, etc.—in addition to toggle switch 214, which is also shown in FIG. 4 and which is described below in connection with FIG. 11.

Figure 5:
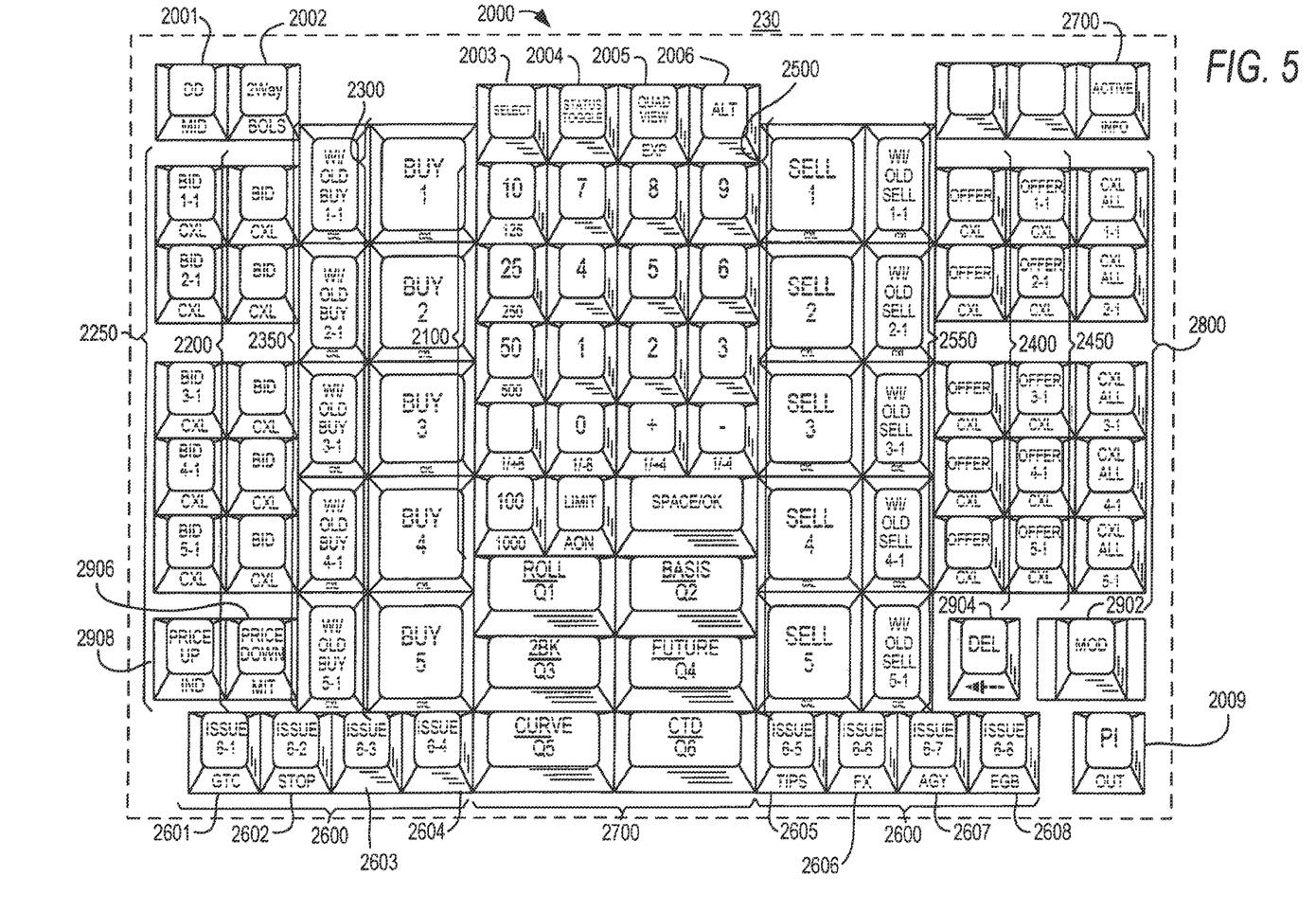
FIG. 5 is a top elevational view of a preferred embodiment of the keyboard of FIG. 2.

As shown in FIG. 5, keys 2000 may be labeled and may be pre-programmed with functionality. Keys 2000 of the keyboard may be divided into subcategories that may be grouped based on the functions that are intended to be associated with them. Such groups of keys may include "DD" key 2001 and "2Way" key 2002. Such keys may be used to perform various functions such as requesting a quote to buy and/or sell a particular instrument, or any other functions relating to styles of Direct Dealing. Such functions may be implemented as described in co-pending commonly assigned U.S. patent application Ser. No. 10/113,841, filed Mar. 29, 2002, co-pending commonly assigned U.S. patent application Ser. No. 10/669,858, filed Oct. 31, 2003 (CF-78), and co-pending commonly assigned U.S. patent application Ser. Nos. 10/640,829 and 10/641,196, filed Aug. 20 13, 2003.

Another example of a set of keys that are grouped based on the functions they are associated with is the group of issue keys 2600, which may include keys 2601 through 2608. Each key pertaining to the same group of keys may be color-coded. For example, keys 2001 and 2002 may be colored yellow, while issue keys 2600 may be colored dark grey, with the exception of issue keys 2601 and 2605, which may be colored differently so that they are more easily identified or located. Some keys may be uniquely color-coded—i.e., a desired color may be dedicated to one and only one key. For example "ALT" key 2006 may be the only key that is colored blue, while "MOD" key 2902 may be the only key that is colored red.

Various keys may be adapted to perform more than a single function, depending on whether such keys are pressed individually or simultaneously. For example, although pressing "Active" key 2007 separately turns the keyboard on or off, pressing "Active" key 2007 while holding down "MOD" key 2902 may cause specific information to be displayed on display 112 of workstation 110 of FIG. 1. Such information may relate to the maker, distributor, and/or licensor of the keyboard system, may pertain to the model or version of the keyboard system, and/or may provide customer service contact information.

In order to facilitate using the keyboard, each key may be labeled with the function or group of keys it is associated with. In addition, each key may be labeled with the additional function it is used to perform when pressed while holding down another key, such as "MOD" key 2902. In this particular example, the label that is associated with the additional or <MOD> function of each key may be colored red, which is the same color that it used to color "MOD" key 2902.

Figure 6:
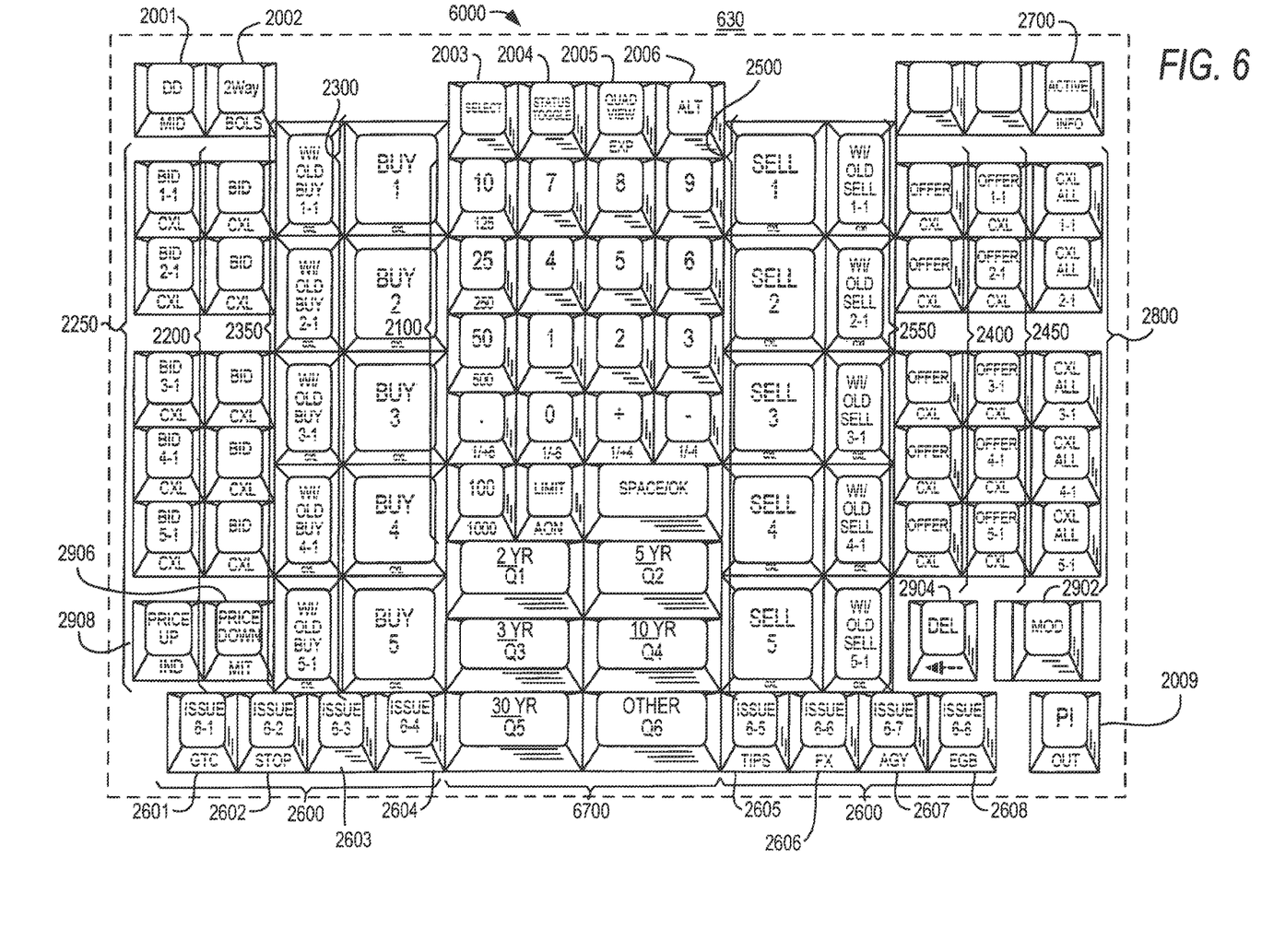
FIG. 6 is a top elevational view of another preferred embodiment of the keyboard of FIG. 2.

At least two types of views or modes, known as benchmark views and specific views, may be provided and associated with the different embodiments of the present invention. FIG. 5 illustrates the top portion 230 of a preferred embodiment of a keyboard that may be adapted for use in conjunction with the benchmark views in view regions 700 and 800 of FIGS. 7 and 8, respectively. FIG. 6 illustrates a top portion 630 of a preferred embodiment of a keyboard that may be adapted for use in conjunction with the specific views in view regions 900 and 1000 of FIGS. 9 and 10, respectively. FIG. 5 will now be described in conjunction with FIGS. 7 and 8.

View region 700, of which an illustrative screenshot is shown in FIG. 7, may display a benchmark view to the user on display 112 of workstation 110 of FIG. 1. View region 700 may be interactive, may include window 780, and may be customized by each user and may contain selectively configured subregions. These subregions may also be in the form of panes and may be referred to as trading quadrants or Quads. In the exemplary arrangement shown in FIG. 7, view region 700 may include panes 710, 720, 730, 740, 750 and 760. Each trading quadrant or pane represents a portion of the view region displaying information relating to financial instruments. Each pane may be dedicated to a benchmark instrument or issue, and a set of issues relating to the benchmark instrument being traded. Panes 710, 720, and 730 may encompass the vertical regions indicated and each may extend horizontally from the left-most edge to approximately the midpoint of the screen. Panes 740, 750, and 760 may encompass the vertical regions indicated and may each extend horizontally from approximately the midpoint of the screen to the right-most edge.

Pane 710 shows a two-year view relating to a two-year U.S. Treasury Note. Pane 740 shows a ten-year view relating to a ten-year U.S. Treasury Note. Pane 720 shows a five-year view relating to a five-year U.S. Treasury Note. Pane 750 shows a thirty-year view relating to a thirty-year U.S. Treasury Bond. Pane 730 shows a three-year view relating to a three-year U.S. Treasury Note. Pane 760 shows additional non-benchmark issues that can be accessed using issue keys 2600. Each pane or portion of a pane may be displayed to users in different colors. For example, the particular instrument being traded by a user may be highlighted or displayed to that user in a color that differs from those of other portions in the same or in different pane.

For each particular issue, the latest key trading indicators may be displayed within a pane, such as: the bid, the offer, the bid/offer sizes, etc. The user may customize the panes to display other information, such as the latest settling price or the total volume traded. Each indicator or set of indicators may be marked with a particular color to indicate features of that component and/or to facilitate viewing of each component. The information displayed may preferably be updated in real-time as the different trades on the instruments are processed.

The user may use bid keys 2200, offer keys 2400, buy keys 2300 and sell keys 2500 in order to place bids/offer orders or buy/sell orders on current issues of particular instruments shown in view region 700. Each row of such keys in FIG. 5 may be used to place orders on different issues shown in the panes of FIGS. 7 and 8. While bid/offer keys 2200 and 2400 and buy/sell keys 2300 and 2500 in a single row may be associated with specific issues, namely the headline or benchmark issue—i.e., the on-the-run topmost issue listed in each pane—bid/offer keys 2250 and 2450 and buy/sell keys 2350 and 2550 in the same row may be associated with any of the other issues that are available in the lower portion of the same panes and that relate to the benchmark issues in these panes, depending on which one of keys 2700 is pressed.

For example, "BUY 1" may be pre-programmed such that when pressed, it allows the user to lift an offer on or purchase the two-year headline notes expiring in March, 2005 in pane 710 at the price shown. Similarly, "SELL 2" may be pre-programmed such that when pressed, it allows the user to hit a bid on or sell the ten-year headline notes expiring in February, 2013 in pane 740 at the price shown.

However, "WI/OLD BUY 1-1" may be pre-programmed such that when pressed, it allows the user to lift an offer on or purchase an older two-year notes expiring in February, 2005 in pane 710 at the price shown, after "ROLL" key 2700 is pressed, denoting the most recent off-the-run issue. Similarly, "WI/OLD SELL 2-1" may be pre-programmed such that when pressed, it allows the user to hit a bid on or sell the 2BK ten-year notes expiring in August, 2012 in pane 740 at the price shown, after "2BK" key 2700 is pressed, denoting the second most recent off-the-run issue.

"MOD" key 2902 may be used with any of bid keys 2200 and 2250, offer keys 2400 and 2450, buy keys 2300 and 2350, and sell keys 2500 and 2550 in order to cancel the particular order that was placed on the instruments with the same key. Alternatively, each "CXL ALL" key of the group of keys 2800 may be used to cancel all pending bid/offer/buy/sell orders on any of the issues of the instrument in a particular pane that is associated with any of keys 2250, 2350, 2450 and 2550 having the same number (e.g., 3-1 or 2-1) as the particular "CXL ALL" key. Alternatively, "MOD" key 2902 may be used with "PI" key 2009 in order to cancel each and every pending order on all the instruments that are shown in panes 710, 720, 730, 740 and 760.

Server 120 of FIG. 1 may translate and process orders that are placed on different issues based on the order in which commands are entered using keyboard 200. Command Line 790 of FIG. 7 may display the series of commands entered using the keys that are pressed to place orders. Any time one of keys 2200, 2300, 2400 or 2500 is pressed, an order may be placed on the available size and price of the headline issue of the instrument in the particular pane associated with the key that is pressed. Similarly, any time one of keys 2250, 2350, 2450 or 2550 is pressed, an order may be placed on the available size and price of the issue of the instrument in the particular pane associated with the key that was most recently pressed from the group of keys 2700. Accordingly, keys 2200, 2300, 2400, 2500, 2250, 2350, 2450 or 2550 may be referred to as order keys.

In order to specify a desired size and price for such issues, keys 2100 may be pressed prior to pressing any of the order keys and after pressing any one of keys 2700. The price and size may be distinguished and separated by pressing "SPACE/OK" key 2100. If only a single number is entered using keys 2100, it may be automatically treated and processed as a price entry. If two numbers are entered, the first may be treated as a price entry, while the second, as a size entry. Alternatively, if one of the numbers that was entered includes a decimal place or a "+" or "−" sign, it may be automatically treated as a price entry. A "+" or "−" sign may be used to increase or decrease the price by an amount that may be configured by the user, such as one quarter or one eight of a basis point.

In order to delete the latest digit that was entered in connection with price or size, the user may press "DEL" key 2904. Alternatively, by pressing "DEL" key 2904 while holding down "MOD" key 2902, the user may be able to move a cursor between the entered digits. The user may then delete the desired digit, group of digits or other commands displayed in command line 790 by simply pressing "DEL" key 2904. The user may also modify the price by pressing "Price Up" key 2908 or "Price Down" key 2906.

In order for a user to place orders on the issues in pane 760, a process similar to the one described above may be used. For example, the user may buy the available size of the non-benchmark issue dated January, 2007 at a price of 109.20 by pressing "ISSUE 6-1" key 2601, followed by any one of keys 2350. Similarly, the user may bid for the available size of the non-benchmark issue dated January, 2012 at the price of 111.21 by pressing "ISSUE 6-6" key 2606, followed by any one of keys 2250. In other words, a portion of order keys may be mapped to correspond to a specific non-benchmark issue displayed in pane 760 when the issue key corresponding to the specific non-benchmark issue is pressed. The user may modify the price and size of the order using keys 2908, 2906 and/or 2100.

"QUAD VIEW" key 2005 allows the user to toggle between the classes of non-benchmark instruments shown in pane 760, such as Treasury Inflation-Protected Securities (TIPS), foreign exchange (FX), Agencies—i.e., bonds issued by government-sponsored agencies, EGBs—i.e., German bonds, and Euros or Eurobonds. The user may place orders on issues of such instruments by continuously pressing "QUAD VIEW" key 2005 until the desired instrument is selected, then pressing the appropriate issue key 2600 followed by any of keys 2250, 2350, 2450 or 2550. Alternatively, pressing issue keys 2605, 2606, 2607 or 2608 while holding down "MOD" key 2902 allows the user to toggle between TIPS, FX, Agencies and EGBs.

By providing a variety of simple ways for accessing different issues of instruments that may be related or unrelated, the present invention allows a user to place orders on such instruments and toggle between them quickly and accurately. For example, a user trading U.S. treasuries may be no more than two or three key compressions away from trading European currency using the keyboard in conjunction with the view region disclosed herein. This allows the user to use his or her fingers to enter trade commands on different instruments while focusing on as little as one view region.

Pressing "QUAD VIEW" key 2005 while holding down "MOD" key 2902 allows the user to contract or expand each of panes 710, 720, 730, 740 and 750. The panes depicted in FIGS. 7 and 8 are examples of expanded panes, while panes 920, 930 and 950 of FIG. 9 are examples of contracted panes.

Other useful information may be shown in window 780. In response to a user pressing "Status Toggle" key 2004, the trading application may provide the user with the trade history of the item or instrument in window 780. In response to the user pressing "Status Toggle" key 2004 multiple times, the trading application may cycle or toggle between different information relating to the item or instrument, such as, for example, the active orders for the item or instrument, the trade history, the market history, or the status of the item or instrument.

Figure 8:
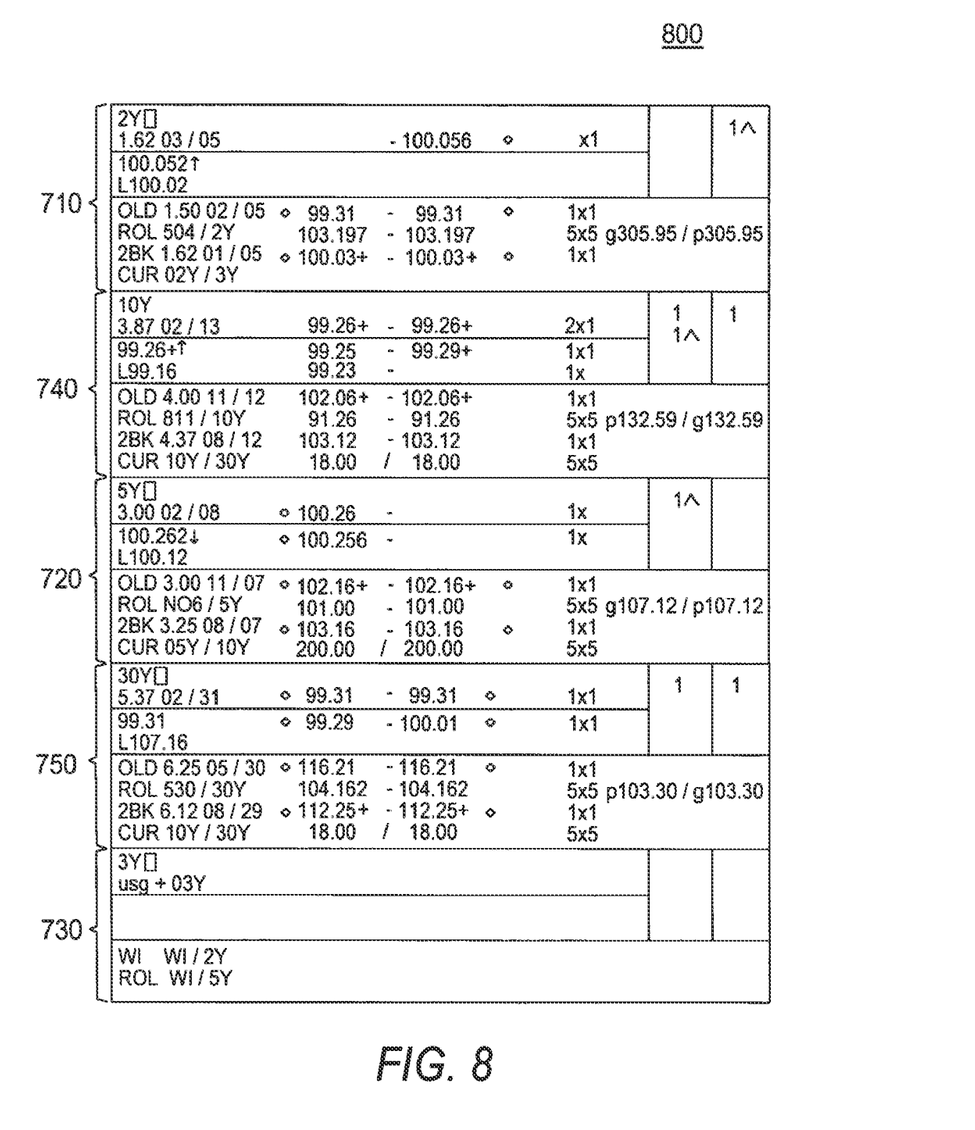
FIG. 8 is an illustration of an alternative embodiment of a view region that may be displayed to a user in accordance with certain embodiments of the present invention.
Figure 9:
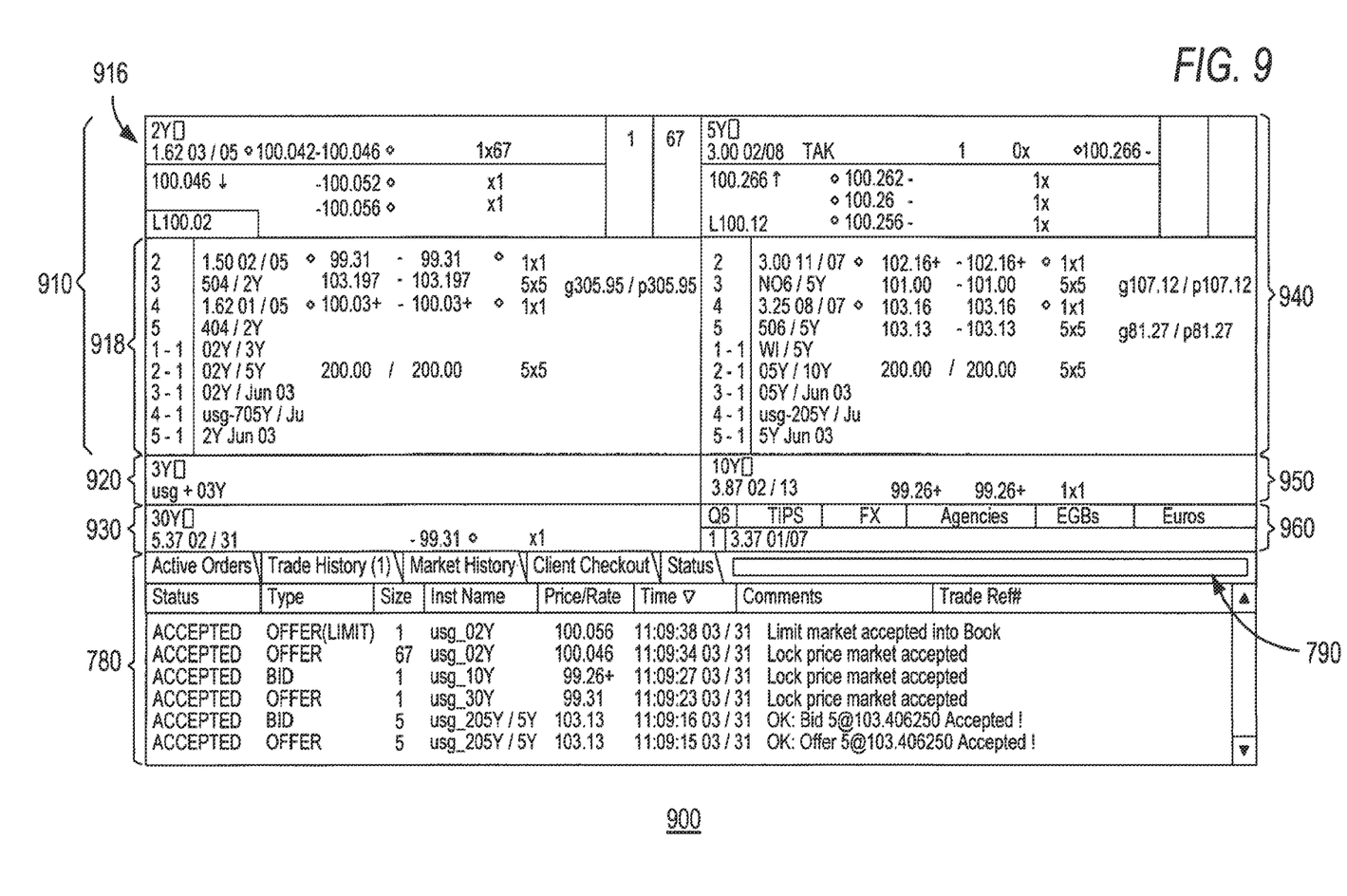
FIG. 9 is an illustration of another alternative embodiment of a view region that may be displayed to a user in accordance with certain embodiments of the present invention.

View region 800, of which an illustrative screenshot is shown in FIG. 8, may display another benchmark view to the user on display 112 of workstation 110 of FIG. 1. View region 800 may be interactive and may be customized by each user. In this exemplary arrangement, the screen has a vertical (portrait) aspect ratio and includes panes 710, 720, 730, 740 and 750, which substantially correspond to the like-numbered panes shown in FIG. 7, but here are arranged vertically. Keys 2000 of FIG. 5 may be used to perform the same functions and display the same information in FIG. 8 as the ones described in connection with FIG. 7.

FIG. 6 will now be described in conjunction with FIGS. 9 and 10. FIG. 6 illustrates a top portion 630 of another preferred embodiment of keyboard 200 of FIG. 2 having keys 6000 that may be labeled and may be pre-programmed substantially similarly to keys 2000 of FIG. 5. Just like keys 2000, keys 6000 may include issue keys 2600, "DD" key 2001, "2Way" key 2002, "Select" key 2003, "Status Toggle" key 2004, "QUAD VIEW" key 2005, "ALT" key 2006, "Active" key 2007, "PI" key 2009, "MOD" key 2902, "DEL" key 2904, "Price Down" and "Price Up" keys 2906 and 2908, and "CXL ALL" keys 2800, which may be associated with substantially the same functions described in conjunction with FIGS. 5 and 7. Keys 6000 may also include bid keys 2200 and 2250, offer keys 2400 and 2450, buy keys 2300 and 2350, sell keys 2500 and 2550, which may be associated with substantially the same functions described in conjunction with FIGS. 5 and 7 when used with issue keys 2600, but which may be associated with different functions otherwise, as described below.

View region 900, of which an illustrative screenshot is shown in FIG. 9, may display a specific view to the user on display 112 of workstation 110 of FIG. 1. View region 900 may be interactive and may be customized by each user and may contain selectively configured panes similar to the ones in FIG. 7. In this exemplary arrangement, the screen has a vertical (portrait) aspect ratio and includes panes 910, 920, 930, 940, 950, 960 (which is a contracted view of pane 760), window 780, and command line 790.

Pane 910 shows an expanded two-year view relating to a two-year U.S. Treasury Note. Pane 940 shows an expanded five-year view relating to a five-year U.S. Treasury Note. Pane 920 shows a three-year view relating to a three-year U.S. Treasury Note. Pane 950 shows a ten-year view relating to a ten-year U.S. Treasury Note. Pane 930 shows a thirty-year view relating to a thirty-year U.S. Treasury Bond.

Figure 10:
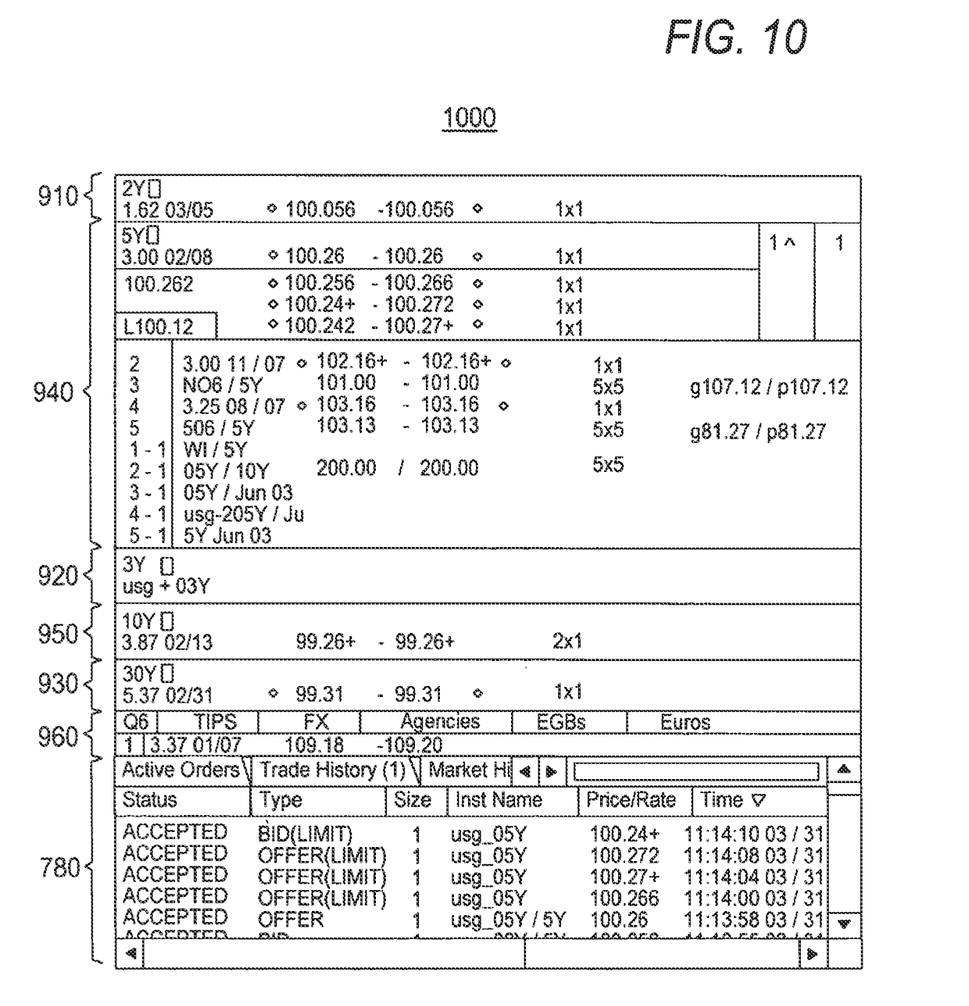
FIG. 10 is an illustration of yet another alternative embodiment of a view region that may be displayed to a user in accordance with certain embodiments of the present invention.

Unlike keys 2000 of FIG. 5, keys 6000 may include keys 6700, which may be used to toggle between and select a particular pane in FIGS. 9 and 10 displaying a benchmark instrument and issues relating to the benchmark instrument. Moreover, keys 6700 may be spatially aligned to correspond to the alignment of panes 910, 920, 930, 940, 950 and 960, so that the keys corresponding to the instruments in those panes are more easily identified, thereby facilitating selecting such instruments.

Although not described in relation to FIGS. 5, 7 and 8, "Select" key 2003 allows the user to toggle between the panes in the specific view of FIG. 9, thereby providing the user with another method for selecting benchmark instruments and particular issues relating to a benchmark instruments.

Once the user selects a particular pane, the user may place orders on different issues within the pane by pressing on order keys 2200, 2250, 2300, 2350, 2400, 2450, 2500 and/or 2450. More specifically, once a user presses one of keys 6700 or "Select" key 2003, to select a particular pane, each one of keys 2200, 2250, 2300, 2350, 2400, 2450, 2500 and 2450 may allow the user to place orders on the particular benchmark instrument in the pane, or any issue related to the benchmark instrument. For example, after the user has pressed "2 YEAR" key 6700, "BUY 1" key 2300 may allow the user to lift an offer on or purchase the two-year headline notes expiring in March, 2005 displayed in portion 916 of pane 910 at the price shown.

As another example, after the user presses "2 YEAR" key 6700, "WI/OLD BUY 5-1" key 2350 may allow the user to hit a bid on or sell the issue preceded by the number 5-1 in portion 918 of pane 740. "BID 5-1" key 2250 may allow the user to place a bid on that same issue, while "OFFER 5-1" may allow the user to place an offer on that same issue. And "WI/OLD SELL 3-1" key 2550 may allow the user to hit a bid on or sell the issue preceded by the number 3-1 in portion 918 of pane 740. Similarly, "BID 3-1" key 2250 may allow the user to place a bid on that same issue, while "OFFER 3-1" may allow the user to place an offer on that same issue.

Accordingly, the order keys may be mapped to correspond to a specific benchmark issue in a particular pane shown in the specific view or mode, as well as issues relating to the specific benchmark issue, when the specific key corresponding to that pane is pressed.

Like in FIG. 5, "MOD" key 2902 may be used with any of bid keys 2200 and 2250, offer keys 2400 and 2450, buy keys 2300 and 2350, and sell keys 2500 and 2550 in order to cancel the particular order that was placed on the instruments with the same key.

Alternatively, each "CXL ALL" key of the group of keys 2800 may be used to cancel all pending bid/offer/buy/sell orders on any of the issues of the instrument in a particular pane that is associated with any of keys 2250, 2350, 2450 and 2550 having the same number (e.g., 3-1 or 2-1) as the particular "CXL ALL" key. Alternatively, "MOD" key 2902 may be used with "PI" key 2009 in order to cancel each and every pending order on all the instruments that are shown in panes 910, 920, 930, 940, 950 and 960.

View region 1000, of which an illustrative screenshot is shown in FIG. 10, may display another specific view to the user on display 112 of workstation 110 of FIG. 1. View region 1000 may be interactive and may be customized by each user. In this exemplary arrangement, the screen has a vertical (portrait) aspect ratio and includes panes 1010 (which corresponds to contracted pane 910 in FIG. 10), and panes 920, 930, 940, and 950, which substantially correspond to the like-numbered panes shown in FIG. 9, but here are arranged vertically along with window 780. Keys 6000 of FIG. 6 may be used to perform the same functions and display the same information in FIG. 10 as the ones described in connection with FIG. 9.

Referring back to FIG. 1, whenever the user presses any of the order keys, processor 111 of the workstation 110 to which the input device 113 or keyboard used to press such a key is coupled may perform certain functions. Such functions may include using a workstation program to display a trading quadrant or pane in the view region, highlight or select the pane in which the instrument is displayed, display trading information relating to the instrument and/or display an order placed by the user in the appropriate pane of the view region. In addition, processor 111 may use the workstation program to communicate each order placed on an issue to server 122 and to receive confirmation that the order was successfully placed, received and/or processed by server 120. Processor 111 may also set a configuration or map the different keys depending on the instrument or pane that is selected.

The functions of processor 111 may also be implemented by processor 121. For example, server 120 may include processor 121 which, in turn, may include processor 111. In such an arrangement, display 122, input device 113 and memory 114 may be replaced by display 122, display 123 and memory 124 respectively. Alternatively, device 120 may act as both a workstation 110 and server 120 in order to execute trades directly.

According to the present invention, keyboard 200 of FIG. 2 may be customized and designed with the flexibility to configure the physical keyboard device to adapt to different product needs. In a preferred embodiment of the present invention, multiple keys can be combined to act as a single larger key to allow keyboard configurations to emphasize certain actions by assigning them relatively larger keys. Grouping keys together as a single larger key to perform a single action without reprogramming applications or the keyboards provides flexibility currently not available in conventional keyboard designs. Unlike standard keyboards, this configuration eliminates or reduces the need for multiple key compressions to be entered to pass different meanings to an application. Dynamic key layouts also provide flexibility to expand or reduce the number of individually identifiable keys on the keyboard.

Figure 11:
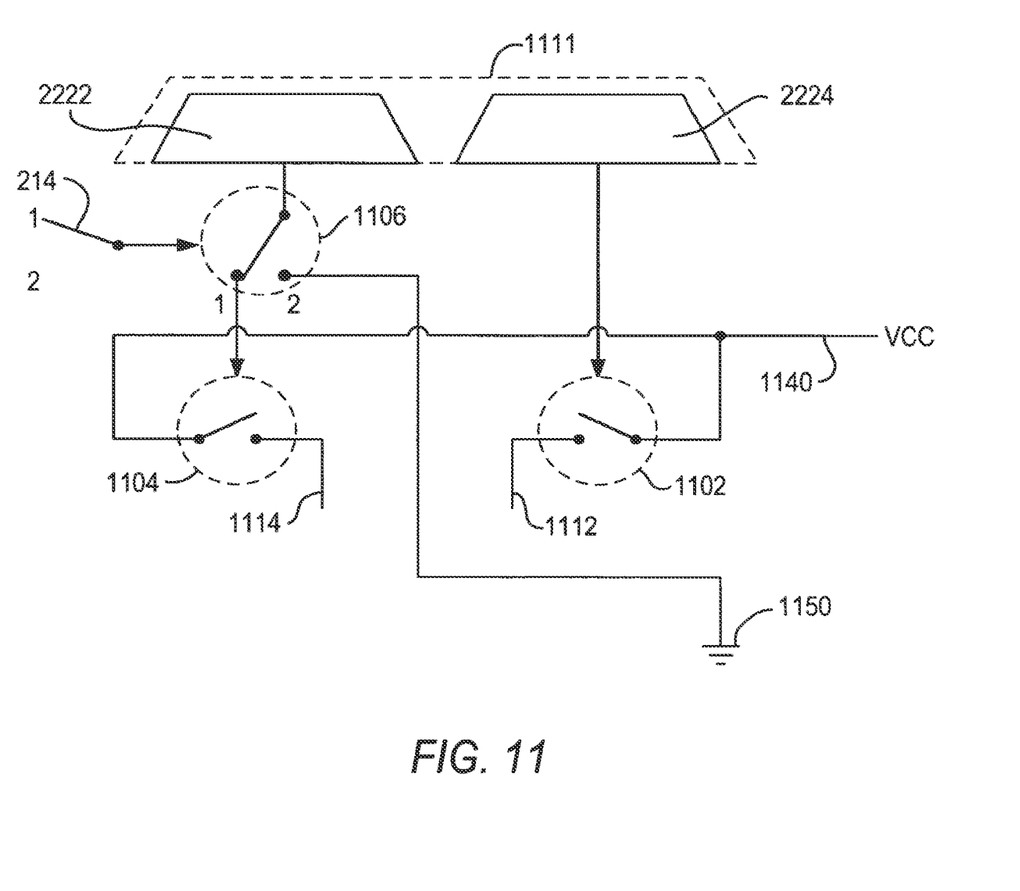
FIG. 11 is an illustration of keys in keyboard FIG. 2 in relation to a partial circuit diagram of the keyboard in accordance with certain embodiments of the present invention.

Referring back to FIGS. 3 and 4, toggle switch 214 may be used to control the functionality of certain keys of keyboard 200, as depicted in FIG. 11. In particular embodiments of the present invention, physically configurable keyboard layouts may be selected by using toggle switch 214 and replacing keys 2222 and 2224 with a single key 1111.

Typical keyboard keys are configured in a way such that pressing any of them closes a circuit, thereby indicating that a particular key was actuated. For example, referring to FIG. 11, pressing key 2224 closes ON-OFF switch 1102, thereby allowing current from line 1140 to flow through line 1112. In certain embodiments of the present invention, toggle switch 214 may preferably be used to change the function of two or more desired keys from one configuration to a second configuration.

Toggle switch 214, or any other suitable device, may be included on the back portion of keyboard 200 as shown in FIGS. 3 and 4, or on any other appropriate location on the keyboard. In a first configuration—i.e., a first position of toggle switch 214—pressing each of physically distinct keys 2222 and 2224 leads to closing ON-OFF switches 1104 and 1102, respectively, when switch 1106 is in a first position. This allows current from line 1140 to flow through each of lines 1114 and 1112, respectively, thereby indicating that these keys have been actuated.

In a second configuration,—i.e., a second position of toggle switch 214—the signal path from key 2222 may be coupled to ground 1150 when switch 1106 is in a second position. Therefore, pressing key 2224 closes ON-OFF switch 1102, thereby allowing current from line 1140 to flow through line 1112, while pressing key 2222 alone does not cause current to flow in any of lines 1112 or 1114. Accordingly, key 2222 may be disabled while in the second configuration.

Therefore, keys 2222 and 2224 may be replaced by single key 1111, which is preferably somewhat larger than each of the two keys. In this way, the keyboard may be adapted to provide a single key that may be associated with a single function, namely, that of 2224, when toggle switch 214 is in the second position where previously two keys, associated with two distinct functions, existed.

Keys 2222 and 2224 may represent any adjacent keys 2000 in keyboard 200. It should be understood that any two or more adjacent keys in keyboard 200 may be replaced by a single larger key that can perform the function of one of the keys that has been replaced or disabled, when utilizing toggle switch 214.

In another embodiment of the present invention, the keyboard configuration may be systemically adjusted according to the type of view being currently displayed to the user. More specifically, as a user switches from a benchmark view or mode to a specific view or mode, the keyboard may be preconfigured to change its mapping and functionality from the mapping of functions described in connection with FIG. 5 to that of FIG. 6. Similarly, as a user switches from a specific view or mode to a benchmark view or mode, the keyboard may be preconfigured to change its mapping and functionality from the mapping of functions described in connection with FIG. 6 to that of FIG. 5.

It is understood that the size, shape, and color of the keyboard, the arrangement of the keys, the color-coding of the keys, the key labels, and any suggested functionality for the keys in FIGS. 5 and 6, 11 and 12 are examples shown for purposes of illustration only. It is also understood that the sizes, shapes, colors and arrangements of the panes and view regions in FIGS. 7-10 are examples shown for purposes of illustration only. It is understood that modifications of any or all of the foregoing characteristics of the keys, keyboards, panes and view regions are within the scope of the present invention.

Finally, one of ordinary skill in the art should appreciate that the present invention may be practiced in embodiments other than those illustrated herein without departing from the spirit and scope of the invention, and that the invention is only limited by the claims which follow.

What is claimed is:

1. An apparatus comprising:
   a display screen;
   a keyboard comprising a communication port to communicate with a display screen and a set of keys; and
   at least one processor to:
      render a plurality of panes on the display screen;
      associate each pane with a given subset of the set of keys on the keyboard;
      render data associated with a different financial instrument in each pane;
      set an input focus to a given pane of the plurality of panes;
      render market data in the given pane of the display screen;
      detect selection of a key in a first subset of keys;
      generate a transaction related to the rendered market data, in response to the selection of the key in the first subset of keys;
      detect a selection of a toggle key on the keyboard; and
      move the input focus to a different pane, in response to the selection.

2. The apparatus of claim 1, wherein the keyboard further comprises a switch to change a function of a given key on the keyboard.

3. The apparatus of claim 2, wherein the at least one processor is further configured to set a function of the given key on the keyboard to function as one of two adjacent keys.

4. The apparatus of claim 3, further comprising a circuit in communication with the switch to configure the given key.

5. The apparatus of claim 1, wherein the keyboard further comprises a key associated with direct dealing.

6. The apparatus of claim 1, wherein the rendered market data includes a first and second type of market data, the first type of market data being related to a benchmark issue.

7. The apparatus of claim 6, wherein the second type of the rendered market data is related to issues different from benchmark issues.

8. The apparatus of claim 1, wherein a key in the first subset of keys, when actuated, is configured to cause at least one processor to submit a bid or an offer for an instrument related to a benchmark issue that is displayed in a pane associated with the first subset of keys.

* * * * *